(12) United States Patent
Tonbe

(10) Patent No.: US 9,067,554 B2
(45) Date of Patent: Jun. 30, 2015

(54) SEAT BELT CONTROL DEVICE, SEAT BELT RETRACTOR, SEAT BELT DEVICE, SEAT BELT CONTROL METHOD, AND PROGRAM

(75) Inventor: Hideyuki Tonbe, Minato-ku (JP)

(73) Assignee: Takata Corporation, Tokyo (JP)

( * ) Notice: Subject to any disclaimer, the term of this patent is extended or adjusted under 35 U.S.C. 154(b) by 5 days.

(21) Appl. No.: 13/582,445

(22) PCT Filed: Mar. 3, 2011

(86) PCT No.: PCT/JP2011/054950
§ 371 (c)(1),
(2), (4) Date: Sep. 3, 2012

(87) PCT Pub. No.: WO2011/108662
PCT Pub. Date: Sep. 9, 2011

(65) Prior Publication Data
US 2012/0326487 A1    Dec. 27, 2012

(30) Foreign Application Priority Data
Mar. 4, 2010   (JP) ................................. 2010-048442

(51) Int. Cl.
*B60R 22/00*   (2006.01)
*B60R 22/44*   (2006.01)
(Continued)

(52) U.S. Cl.
CPC ..... *B60R 21/0132* (2013.01); *B60R 2022/4473* (2013.01)

(58) Field of Classification Search
CPC ........ B60R 22/00; B60R 22/34; B60R 22/44; B60R 22/46; B60R 22/48; B60R 22/195; B60R 21/00; B60R 21/01546; G06F 11/30; G05D 23/19
USPC ........... 701/50, 48, 47, 46, 45, 38, 37, 36, 22, 701/532; 374/189; 340/457.1; 123/41.15; 242/390, 390.8, 390.9; 280/807, 801; 63/133; 165/202, 42; 297/475; 191/2; 180/268
See application file for complete search history.

(56) References Cited

U.S. PATENT DOCUMENTS 5,168,415 A  * 12/1992  Osuga ............................. 361/28
7,269,963 B2 *  9/2007  Yonekura et al. ............... 62/133
(Continued)

FOREIGN PATENT DOCUMENTS

| DE | 102008005645 | * | 7/2009 |
| JP | 2006-142984 |  | 6/2006 |

(Continued)

OTHER PUBLICATIONS

International Search Report PCT/JP2011/054950 dated Apr. 19, 2011.

*Primary Examiner* — John Q Nguyen
*Assistant Examiner* — Aaron Smith
(74) *Attorney, Agent, or Firm* — Foley & Lardner LLP

(57) ABSTRACT

Based on the operation of a motor driver (16), a counter (13) makes an addition to and a subtraction from a heat generation counter value which is stored in a storage (14) and represents the temperature variation of a motor (7) and/or the motor driver (16). Once a switching decider (12) decides that a shift has been made from a normal operation mode, in which operating power is supplied, to a sleep mode which has a lower power consumption than that in the normal operation mode, a power source controller (15) refers to the heat generation counter value; and, when the heat generation counter value is equal to or more than a specified threshold value, the power source controller (15) stands by until the counter (13) makes a subtraction from the heat generation counter value to the threshold value and then shifts to the sleep mode.

16 Claims, 6 Drawing Sheets

(51) Int. Cl.
*B60R 22/46* (2006.01)
*B60R 22/48* (2006.01)
*B60R 21/00* (2006.01)
*B60R 21/0132* (2006.01)

(56) References Cited

U.S. PATENT DOCUMENTS

| | | | |
|---|---|---|---|
| 7,389,843 B2 * | 6/2008 | Midorikawa | 180/268 |
| 7,661,504 B2 * | 2/2010 | Odate | 180/270 |
| 8,457,845 B2 * | 6/2013 | Takao et al. | 701/45 |
| 8,532,874 B2 * | 9/2013 | Matthies et al. | 701/37 |
| 2010/0125392 A1 * | 5/2010 | Takao et al. | 701/45 |

FOREIGN PATENT DOCUMENTS

| | | |
|---|---|---|
| JP | 2006-175896 | 7/2006 |
| JP | 2006-273107 | 10/2006 |
| JP | 2007-245854 | 9/2007 |
| JP | 2009-255749 * | 11/2009 |
| JP | 2009255749 A * | 11/2009 |

* cited by examiner

SEAT BELT CONTROL DEVICE, SEAT BELT RETRACTOR, SEAT BELT DEVICE, SEAT BELT CONTROL METHOD, AND PROGRAM

TECHNICAL FIELD

The present invention relates to seat belt control devices, seat belt retractors, seat belt devices, seat belt control methods, and programs.

BACKGROUND ART

A seat belt device is a device that is included in a vehicle such as a car and protects a passenger and generally includes a seat belt retractor. The seat belt retractor is a wind-up machine that winds up and houses a seat belt when the seat belt device is not being used and applies a specified tensile force to the seat belt when the seat belt device is being used.

Formerly, a type of a seat belt retractor which winds up a seat belt by the force of a spring has been used; however, since, in this type of a seat belt retractor, a tensile force applied to a seat belt depends on the pull-out length of the seat belt, it has been difficult to apply a suitable tensile force to the seat belt. Thus, a seat belt retractor employing an electric motor has also recently been used. Also, a seat belt retractor has been controlled by a computer included in a seat belt device to apply a specified tensile force to a seat belt. Hereinafter, the computer that is included in the seat belt device and controls the seat belt retractor is referred to herein as a seat belt control device.

The seat belt control device is a kind of ECU (Electronic Control Unit) which is a computer that control car fittings and/or the like. Since an ECU is operated by the power of an in-vehicle battery, an in-vehicle battery voltage may be decreased to make it impossible to start an engine when an ECU continues to be operated in a non-charged state. Thus, there is the technology of shifting an ECU to a sleep mode when a vehicle is in a specified state. The sleep mode refers to the state in which the power consumption of an ECU is lower than that in a normal operation mode and specifically encompasses a standby mode in which an oscillator which constitutes an ECU is stopped, a slow clock mode in which an operation is performed with a low frequency oscillator different from that in a normal operation, and an intermittent mode in which a computer is intermittently operated at specific time intervals. Currently, a method of reducing power consumption by drastically stopping the functions of a computer and executing only a minimal function (such as a function relating to wake-up) is used. In addition, once a specified wake-up signal is input into an ECU in a sleep mode state, the sleep mode of the ECU is canceled and returns to a normal operation mode.

In a motor drive device that drives the electric motor of a seat belt retractor, a function must be protected from an increase in the temperature of a transistor. Thus, there is a technology that performs motor drive limitation in order to suppress an increase in the temperature of a transistor to a specific value or less.

Patent Literature 1 discloses a motor control device for a seat belt retractor, which confirms, prior to driving a motor beforehand, that drive limitation is not performed during driving a motor, and drives the motor only when there are no problems. The motor control device for a seat belt retractor of Patent Literature 1 compares a counter value varying depending on variation in the temperature of a switching element with a preset threshold value and performs drive limitation when the counter value is more than the preset threshold value.

Patent Literature 2 discloses a seat belt control device which can precisely detect the overheated state of a drive circuit. Patent Literature 2 discloses the technology of interrupting power supply from a power source to protect the drive circuit from being overheated when the overheated state of the drive circuit is detected. Circuit protection means according to Patent Literature 2 is, for example, hardware such as a temperature-sensitive field effect transistor.

Patent Literature 3 discloses an occupant restraint device wherein, when a motor is in an overheated state, a physical sensation alarm (first alarm) is stopped, the operation of an overheat protection function is avoided even at a penalty in the physical sensation alarm, and an occupant can surely be restrained at the time of important occupant restraint (second alarm), from the viewpoint of occupant protection. The overheat protection function according to Patent Literature 3 is hardware such as a thermal protector. The thermal protector is a device for preventing burnout which occurs when the coil temperature of a motor is more than a specified heatproof temperature.

PRIOR ART LITERATURE

Patent Literature

Patent Literature 1:
Unexamined Japanese Patent Application Kokai Publication No. 2009-255749
Patent Literature 2:
Unexamined Japanese Patent Application Kokai Publication No. 2007-245854
Patent Literature 3:
Unexamined Japanese Patent Application Kokai Publication No. 2006-273107

DISCLOSURE OF THE INVENTION

Problems to be Solved by the Invention

However, in the case of including hardware in which the temperature of a drive circuit is measured and drive limitation is performed when the temperature becomes equal to or more than a specified threshold value, as in Patent Literature 2 and Patent Literature 3, accurate measurement of a temperature in the drive circuit requires calibration of an actually measured value in consideration of a position at which a thermometer is installed and thermal conduction. Also, there is a problem that a cost of realizing a function by hardware is more than when a function is realized by software.

Further, in the case of the technology of using a counter value varying depending on temperature variation, as in Patent Literature 1, it cannot be decided whether or not to set sufficient cooling time during a sleep mode since a time course cannot be measured in the sleep mode, so that a counter is reset to perform initialization in the case of shift to the sleep mode. As described above, since the counter is reset in the case of the shift to the sleep mode in the technology of using a counter value varying depending on temperature variation, the temperature of a drive circuit may actually remain high even if a counter value is zero in the case of shift to a normal operation mode immediately after the shift to the sleep mode. At this time, an actual temperature may be higher than the temperature of the drive circuit predicted by the counter value. Further, since heat generation may be repeated to make it exceed the drivable upper limit temperature of the drive circuit by repeating the shift to the normal operation mode immediately after the shift to the sleep mode, it is necessary to measure the actual temperature of a motor or a motor driver.

The present invention is accomplished with respect to such circumstances and is aimed at providing: a seat belt control device which is inexpensive and prevents an actual temperature of a drive circuit from being higher than the temperature predicted by a counter value; a seat belt retractor; a seat belt device; a seat belt control method; and a program.

Means for Solving the Problems

A seat belt control device according to a first aspect of the present invention is a seat belt control device which controls a motor which winds up a seat belt, the seat belt control device including:

a storage which stores a heat generation counter value which represents a temperature variation state of the motor and/or a motor driver;

a counter which makes an addition/subtraction of a specified value to/from the heat generation counter value based on operation of the motor driver;

a decider which decides whether or not to shift from a normal operation mode, in which operating power is supplied to the seat belt control device, to a sleep mode which has a lower power consumption than that of the normal operation mode; and a controller which shifts to the sleep mode once the decider decides that a shift to the sleep mode has been made, wherein, when the heat generation counter value obtained when the decider decides that the shift to the sleep mode has been made is equal to or greater than a specified threshold value, the controller stands by until the counter makes a subtraction from the heat generation counter value to the threshold value and then shifts to the sleep mode.

Preferably, an information acquirer which acquires an external temperature and/or an internal temperature information of a vehicle including the seat belt control device is further included, wherein the counter sets an initial value of the heat generation counter value based on the external temperature and/or the internal temperature; and the controller sets the threshold value based on the initial value of the heat generation counter value.

Preferably, the controller sets the threshold value based on a temperature variation state of the motor and/or the motor driver, which is measured to be under a maximum temperature at which the motor and/or the motor driver are drivable.

A seat belt retractor according to a second aspect of the present invention includes:

the seat belt control device according to the first aspect of the present invention.

A seat belt device according to a third aspect of the present invention includes:

a seat belt;

a guiding anchor which guides the seat belt toward a passenger;

a tang which is slidably supported by the seat belt;

a buckle which is fixed in a car and is connected to the tang;

a seat belt retractor which applies a specified tensile force by winding up the seat belt on a reel;

a motor which drives the reel; and the seat belt control device according to the first aspect of the present invention.

A seat belt control method according to a fourth aspect of the present invention is a seat belt control method by which a motor which winds up a seat belt is controlled, the method including:

a storage step of storing a heat generation counter value which represents a temperature variation state of the motor and/or the motor driver;

a count step of making an addition/subtraction of a specified value to/from the heat generation counter value based on operation of the motor driver;

a decision step of deciding whether or not to shift from a normal operation mode, in which operating power is supplied to execute seat belt control, to a sleep mode which has a lower power consumption than that of the normal operation mode; and a control step of shifting to the sleep mode when the decision step decides that a shift to the sleep mode has been made, wherein, when the heat generation counter value obtained when the decision step decides that the shift to the sleep mode has been made is equal to or greater than a specified threshold value, the control step stands by until the count step makes a subtraction from the heat generation counter value to the threshold value and then shifts to the sleep mode.

Preferably, an information acquisition step of acquiring an external temperature and/or an internal temperature information of a vehicle is further included, wherein an initial value of the heat generation counter value is set based on the external temperature and/or the internal temperature in the count step; and the threshold value is set based on the initial value of the heat generation counter value in the control step.

Preferably, in the control step, the threshold value is set based on a temperature variation state of the motor and/or the motor driver, which is measured to be under a maximum temperature at which the motor and/or the motor driver are drivable.

A program according to a fifth aspect of the present invention makes a computer execute:

a storage step of storing a heat generation counter value which represents a temperature variation state of a motor, which winds up a seat belt, and/or a motor driver;

a count step of making an addition/subtraction of a specified value to/from the heat generation counter value based on operation of the motor driver;

a decision step of deciding whether or not to shift from a normal operation mode, in which operating power is supplied to the computer, to a sleep mode which has a lower power consumption than that of the normal operation mode; and a control step of shifting to the sleep mode when the decision step decides that a shift to the sleep mode has been made, wherein, when the heat generation counter value obtained when the decision step decides that the shift to the sleep mode has been made is equal to or greater than a specified threshold value, the control step stands by until the count step makes a subtraction from the heat generation counter value to the threshold value and then shifts to the sleep mode.

Effects of the Invention

In accordance with the present invention, a seat belt control device can prevent an actual temperature from being higher than the temperature of a drive circuit that was predicted by a counter value, by software control, even when shifting from a sleep mode to a normal operation mode. As a result, cost can be reduced compared with the case of realizing drive limitation of a motor by hardware.

MODE FOR CARRYING OUT THE INVENTION

Figure 1:
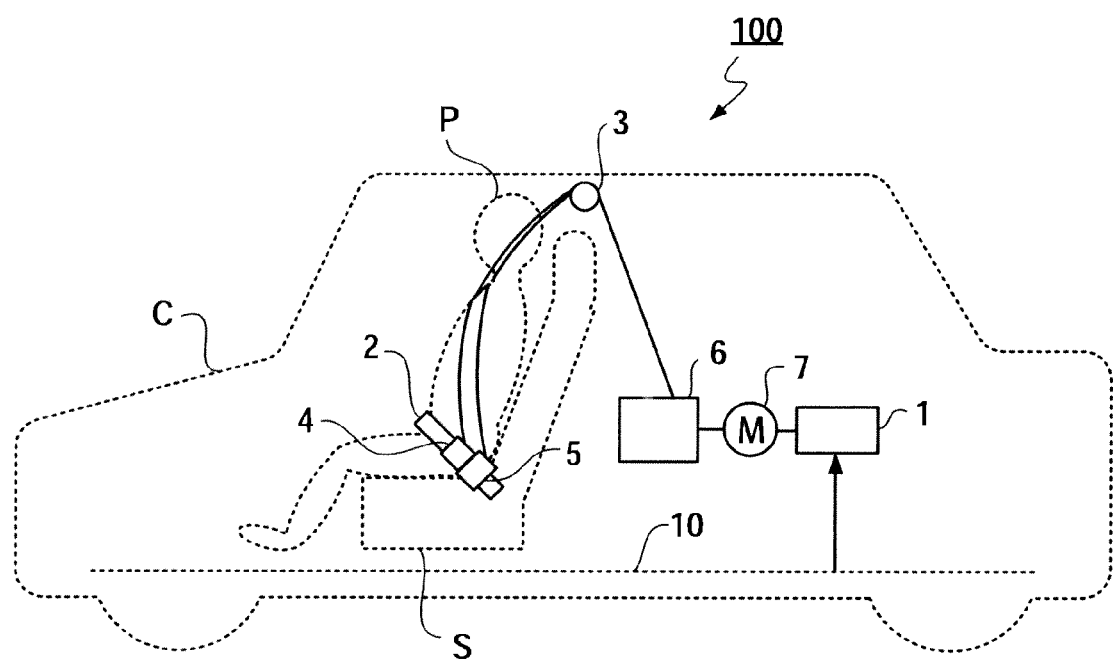
FIG. 1 is a block diagram illustrating a configuration example of a seat belt control system according to an embodiment 1 of the present invention.

In accordance with the present invention, the normal operation mode refers to the state of supplying operating power to a seat belt control device. The sleep mode refers to the state in which an amount of consumed power is less than that in the normal operation mode and the operating power consumption of a seat belt control device is minimized to zero and specifically to the power-saving state in which power is supplied mainly to the component (configuration) for deciding whether or not to shift from the sleep mode to the normal operation mode.

Embodiments of the present invention will be described in detail below referring to the drawings. The same or corresponding components as those in the drawings are denoted by the same reference signs, and the explanation will not be repeated.

(Embodiment 1)

FIG. 1 is a block diagram illustrating a configuration example of a seat belt control system according to an embodiment 1 of the present invention. The seat belt control system 100 is a system which is included in a car C and restrains a passenger P in a seat S, as illustrated in FIG. 1. The seat belt control system 100 includes a seat belt 2; a guiding anchor 3 which guides the seat belt 2 toward the passenger P; a tang 4 which is slidably supported by the seat belt 2; a buckle 5 which is fixed in the car C and is connected to the tang 4; a seat belt retractor 6; a motor 7; and a seat belt control device 1.

One end of the seat belt 2 is fixed to a side part (back side of the page in the figure) of the seat S in the car C. In addition, the seat belt 2 reaches the opposite side (front side of the page in the figure) of the seat S over the abdomen of the passenger P and, by connecting the tang 4 to the buckle 5, is supported in its position by the car C. Further, the seat belt 2 reaches the upper part (above the shoulder of the passenger P) of the seat S over the chest of the passenger P, is passed on the guiding anchor 3, changes in direction, and is pulled into the seat belt retractor 6.

The seat belt retractor 6 is a device which includes a reel, (not illustrated) that winds up the seat belt 2 on the reel and applies a specified tensile force to the seat belt 2. When the seat belt 2 is not being used, the seat belt 2 is wound up and housed in the seat belt refractor 6. In addition, the reel of the seat belt retractor 6 is driven by the motor 7. Power to drive the motor 7 is supplied from the seat belt control device 1.

The seat belt control device 1 is a computer device which controls the seat belt retractor 6 through the motor 7. A signal that indicates the state of the car C is supplied from another ECU (Electronic Control Unit) or sensor in the car C to the seat belt control device 1 through an in-vehicle communication line 10. ECU is the generic term of computers that control car fittings and/or the like, and the seat belt control device 1 is one of ECUs.

The in-vehicle communication line 10 is a communication line through which data is transmitted and received between ECU and a sensor included in the car C, pursuant to communication standards such as for example CAN (Controller Area Network) and LIN (Local Interconnect Network).

Figure 2:
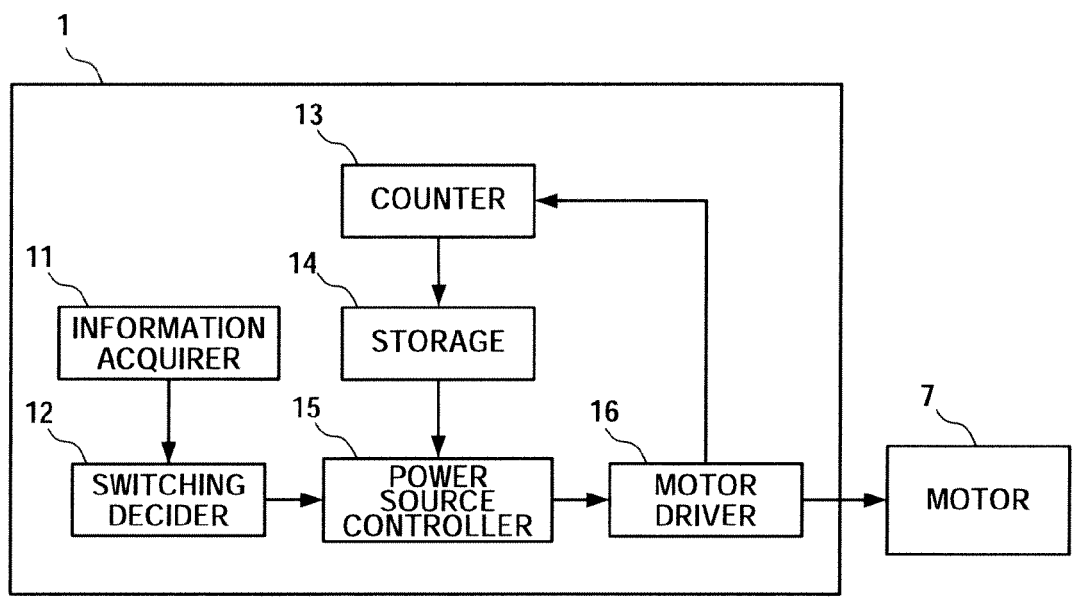
FIG. 2 is a block diagram illustrating a logical configuration example of a seat belt control device according to the embodiment 1.

FIG. 2 is a block diagram illustrating a logical configuration example of the seat belt control device according to the embodiment 1. The seat belt control device 1 is configured by an information acquirer 11, a switching decider 12, a counter 13, a storage 14, a power source controller 15, and a motor driver 16.

The information acquirer 11 acquires information for performing decision whether or not to shift from the sleep mode to the normal operation mode or decision whether or not to shift from the normal operation mode to the sleep mode (hereinafter referred to as mode switching decision).

The switching decider 12 performs mode switching decision based on information acquired by the information acquirer 11. When the information acquirer 11 acquires at least one item of information that triggers a shift from the sleep mode to the normal operation mode (e.g., information indicating the start of an engine), the switching decider 12 decides that the shift has been made from the sleep mode to the normal operation mode. In addition, the switching decider 12 decides that a shift has been made from the normal operation mode to the sleep mode when deciding that the car C is in a specified state (e.g., a state in which an engine is stopped) based on information acquired by the information acquirer 11. The switching decider 12 transmits a wake-up signal to the power source controller 15 when deciding that a shift has been made from the sleep mode to the normal operation mode. The switching decider 12 transmits a sleep signal to the power source controller 15 when deciding that a shift has been made from the normal operation mode to the sleep mode.

The counter 13 makes an addition to and a subtraction from a heat generation counter value which is stored in the storage 14, depending on the predicted temperature variation of the motor driver 16. Specifically, since the transistor of the motor driver 16 generates heat by a motor driving current, a constant value (specified value) is added to the heat generation counter value whenever the motor driver 16 drives the motor 7. Alternatively, a specific value is added to the heat generation counter value based on a drive current value. Since temperature is decreased by heat dissipation while the motor driver 16 does not drive the motor 7, a specific value is subtracted at specific time intervals. As a result, the heat generation counter value functions as an index indicating the temperature state of the motor driver 16. The counter 13 may also make an addition to and a subtraction from the heat generation counter value stored in the storage 14, depending on the predicted temperature variation of the motor 7, or may also calculate the heat generation counter value depending on the predicted temperature variations of both of the motor driver 16 and the motor 7. In addition, even when the heat generation counter value is calculated depending on the predicted temperature variation of the motor 7, the counter 13 performs the calculation by adding a specific value to the heat generation counter value whenever the motor driver 16 drives the motor 7 or by adding a specific value to the heat generation counter value based on a drive current value.

A value added to and subtracted from the heat generation counter value is preferably determined based on a measured value obtained by pre-measuring a variation in temperature increased whenever the motor driver 16 actually drives the motor or a variation in temperature decreased after stopping of the motor driver 16. At this time, it is preferably determined based on the value measured under a bad condition (e.g., 85° C.) like a maximum temperature at which the motor driver 16 is drivable. Actually, according to the kind of the drive mode of the motor driver 16, a drive current value varies and an increasing temperature variation also differs. Thus, a drive count table in which increasing and decreasing temperatures per unit time are measured and associated according to the drive mode are pre-generated, and the counter 13 may also calculate the heat generation counter value with reference to the drive count table. Alternatively, a value in proportion to the drive current value may also be added to the heat generation counter value. In addition, the counter 13 does not makes a subtraction from the heat generation counter value to an initial value or less. Once the seat belt control device 1 shifts to the sleep mode, the heat generation counter value is reset to the initial value at the time of wake-up.

The storage 14 stores the heat generation counter value.

The power source controller 15 controls the power of the seat belt control device 1. In addition, when the heat generation counter value exceeds a specified value, the power source controller 15 stops power supplied to the motor driver 16 and prevents the motor driver 16 from being in an overheated state. Further, the power source controller 15 shifts the seat belt control device 1 to the normal operation mode when receiving the wake-up signal from the switching decider 12 during the sleep mode. The power source controller 15 acquires the heat generation counter value from the storage 14 when receiving the sleep signal from the switching decider 12 during the normal operation mode and shifts the seat belt control device 1 to the sleep mode when the heat generation counter value is lower than a threshold value α. On the other hand, when the heat generation counter value is higher than the threshold value α, the power source controller 15 stands by until the heat generation counter value becomes equal to the threshold value α and shifts the seat belt control device 1 to the sleep mode when the heat generation counter value becomes equal to the threshold value α.

The threshold value α is a value in expectation of a subtraction from the heat generation counter value to the initial value for time from a shift to the sleep mode to wake-up. The threshold value α may be a value where a heat generation counter is subtracted to zero for such short time that wake-up does not occur in the great majority of cases (e.g., 99%) in a time distribution from the shift to the sleep mode to the wake-up. The threshold value α is preferably set based on data measured under a bad condition (e.g., 85° C.) like a maximum temperature at which the motor driver 16 is drivable. Also, the threshold value α may be zero. In that case, a shift to the sleep mode occurs when the heat generation counter value become the initial value.

Figure 3:
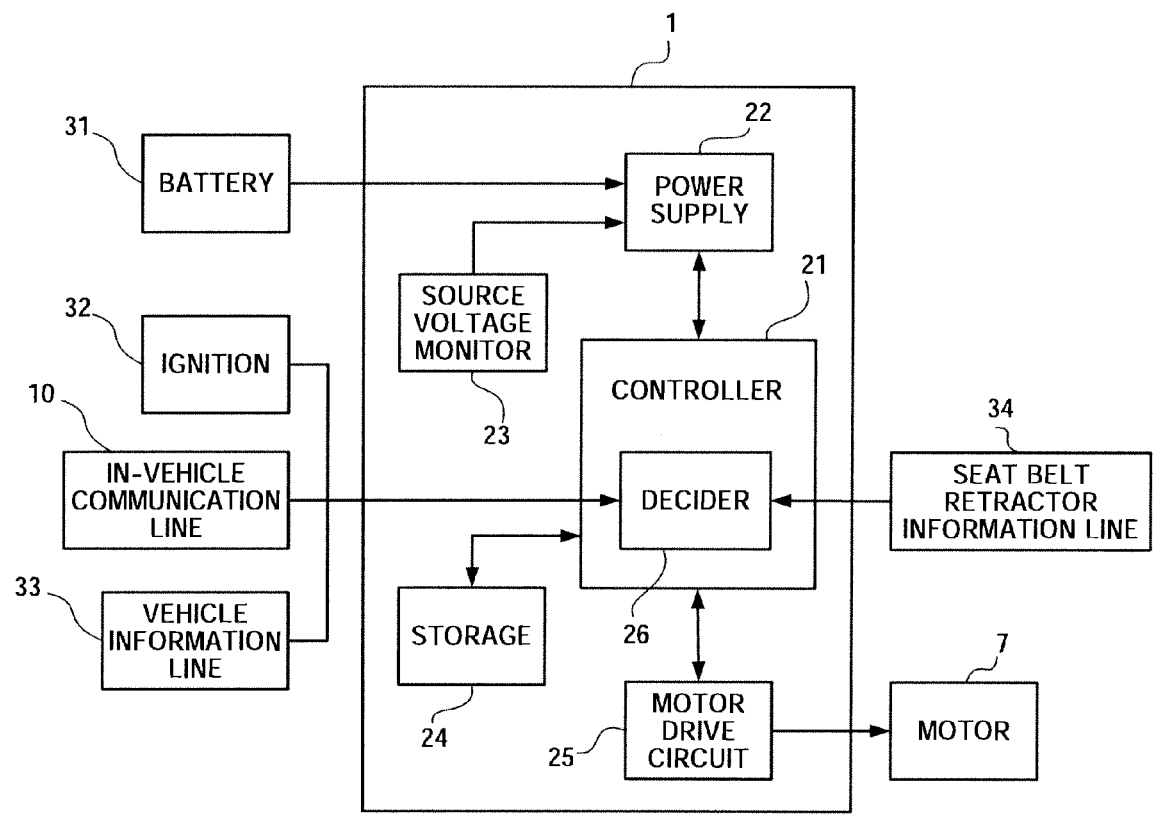
FIG. 3 is a block diagram illustrating a hardware configuration example of the seat belt control device according to the embodiment 1.

FIG. 3 is a block diagram illustrating a hardware configuration example of the seat belt control device according to the embodiment 1. As illustrated in FIG. 3, the seat belt control device 1 includes a controller 21, a power supply 22, a source voltage monitor 23, a storage 24, and a motor drive circuit 25.

The controller 21 is configured by a CPU (Central Processing Unit) and/or the like and executes each process of the information acquirer 11, the switching decider 12, the counter 13, the storage 14, the power source controller 15, and the motor driver 16 of the seat belt control device 1 according to a control program stored in the storage 24. The controller 21 includes a decider 26. The decider 26 acquires information for performing mode switching decision from an ignition 32, the in-vehicle communication line 10, a vehicle information line 33, and a seat belt retractor information line 34 and performs mode switching decision. Only the decider 26 is supplied power during the sleep mode and during decision whether or not to shift from the sleep mode to the normal operation mode is performed.

When the heat generation counter value stored in the storage 14 exceeds a specified value, the controller 21 stops power supplied to the motor drive circuit 25 and prevents the motor drive circuit 25 from being in an overheated state. In addition, the controller 21 adds a specific value to the heat generation counter value whenever the motor drive circuit 25 drives the motor 7. While the motor driver 16 does not drive the motor 7, a specific value is subtracted at specific time intervals. When this heat generation counter value is lower than the threshold value α, the controller 21 immediately shifts to the sleep mode when shifting from the normal operation mode to the sleep mode. When this heat generation counter value is higher than the threshold value α, it stands by until the heat generation counter value becomes equal to the threshold value α and then shifts to the sleep mode. The controller 21 functions as the counter 13 by operating.

The ignition 32 is an electric ignition system and transmits to the decider 26 an ignition switch signal indicating the ignition of the engine when the engine of the car C is ignited.

The in-vehicle communication line 10 is a communication line through which data is transmitted and received between ECUs and sensors included in the car C, pursuant to communication standards such as for example CAN and LIN. Through the in-vehicle communication line 10, signals indicating, for example, the operating state of the engine, the position of a selector lever, the release of a parking brake, the opening and shutting of a cable way, and/or the like are transmitted to the decider 26.

The vehicle information line 33 is a line for directly acquiring vehicle information which cannot be acquired through the in-vehicle communication line 10. Through the vehicle information line 33, for example, a buckle switch signal indicating the connection of the tang 4 to the buckle 5, a door switch signal indicating the opening of a door, and/or the like are transmitted to the decider 26.

The seat belt retractor information line 34 is a line for acquiring seat belt retractor information for the seat belt. Through the seat belt retractor information line 34, signals indicating, for example, the rotation angle of the seat belt retractor 6, seat belt pulling locking, and/or the like are transmitted to the decider 26. The controller 21 (decider 26) which receives signals from the ignition 32, the in-vehicle communication line 10, the vehicle information line 33, and the seat belt retractor information line 34 functions as the information acquirer 11 or the switching decider 12 by operating.

The power supply 22 acquires power from a battery 31 in the vehicle and supplies the power is to the controller 21.

The source voltage monitor 23 is a monitoring circuit which prevents a voltage in the seat belt control device 1 from being not less than a predetermined voltage. The power supply 22, the source voltage monitor 23, and the controller 21 function as the power source controller 15 by cooperatively operating.

The storage 24 is configured by a nonvolatile memory such as a flash memory and pre-stores a control program for making the controller 21 perform the process of the seat belt control device 1. In addition, the storage 24 supplies data stored in the control program to the controller 21 in compliance with instructions from the controller 21 and stores data supplied from the controller 21. The storage 24 may also store the heat generation counter value and function as the storage 14.

The motor drive circuit 25 is configured by a plurality of transistors and supplies power to the motor 7, in compliance with a command from the controller 21, to drive the motor 7. The motor drive circuit 25 functions as the motor driver 16 by operating.

The processes of the information acquirer 11, the switching decider 12, the counter 13, the power source controller 15, and the motor driver 16 of the seat belt control device 1 illustrated in FIG. 2 are executed by processing by the control program using the controller 21, the power supply 22, the source voltage monitor 23, the storage 24, and the motor drive circuit 25 as resources.

Figure 4:
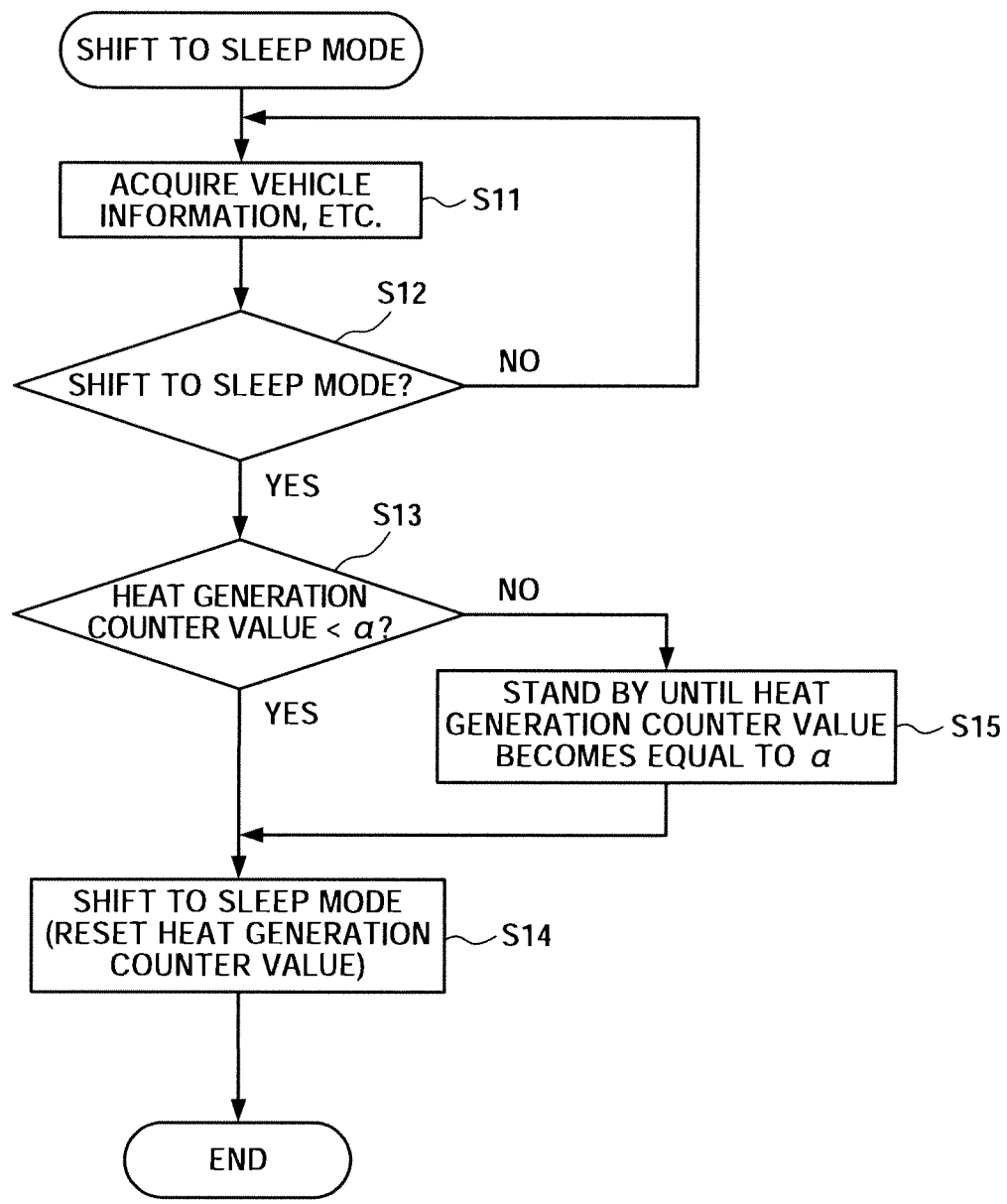
FIG. 4 is a flow chart illustrating an example of the operation of a shift to a sleep mode according to the embodiment 1.

FIG. 4 is a flow chart illustrating an example of the operation of the shift to the sleep mode according to the embodiment 1. When the seat belt control device 1 is in the normal operation mode, the operation process is started at an optional timing. First, the informational acquirer 11 acquires vehicle information and seat belt retractor information (step S11). Based on these pieces of information, the switching decider 12 decides whether or not to shift to the sleep mode (step S12). Once the switching decider 12 decides that no shift is made to the sleep mode (step S12; NO), it returns to step S11, stands by for specified time, and then repeats the processes of step Sll and step S12.

Once the switching decider 12 decides that the shift to the sleep mode is made (step S12; YES), the power source controller 15 refers to the heat generation counter value of the storage 14 and decides whether or not the heat generation counter value is lower than the threshold value $\alpha$ (step S13). When the temperature of the motor driver 16 is decreased by heat dissipation, the heat generation counter value is decreased by a specific value at specific time intervals. Since the heat generation counter value is correlated with the temperatures of the motor driver 16, it can be decided that the motor driver 16 (motor drive circuit 25) is not in an overheated state, when the power source controller 15 decides that the heat generation counter value is lower than the threshold value $\alpha$. When the heat generation counter value is lower than the threshold value $\alpha$ (step S13; YES), the power source controller 15 shifts the seat belt control device 1 to the sleep mode (step S14) to end the process. When the heat generation counter value is higher than the threshold value $\alpha$ (step S13; NO), the power source controller 15 stands by until the counter 13 makes a subtraction from the heat generation counter value to the threshold value $\alpha$ (step S15) and shifts the seat belt control device 1 to the sleep mode once the heat generation counter value become equal to the threshold value $\alpha$ (step S14) to end the process. Once the seat belt control device 1 shifts to the sleep mode, the heat generation counter value is reset.

According to the seat belt control device 1 of the embodiment 1, since drive limitation for protecting the drive circuit from an overheated state can be realized by software, a cost can be reduced compared with the case of its realization by hardware. In addition, since a temperature is not measured, it is not necessary to calibrate an actually measured value in consideration of a position at which a thermometer is installed and thermal conduction. In addition, an actual temperature can be prevented from being higher than the temperature of the drive circuit, predicted by the heat generation counter value.

(Embodiment 2)

Figure 5:
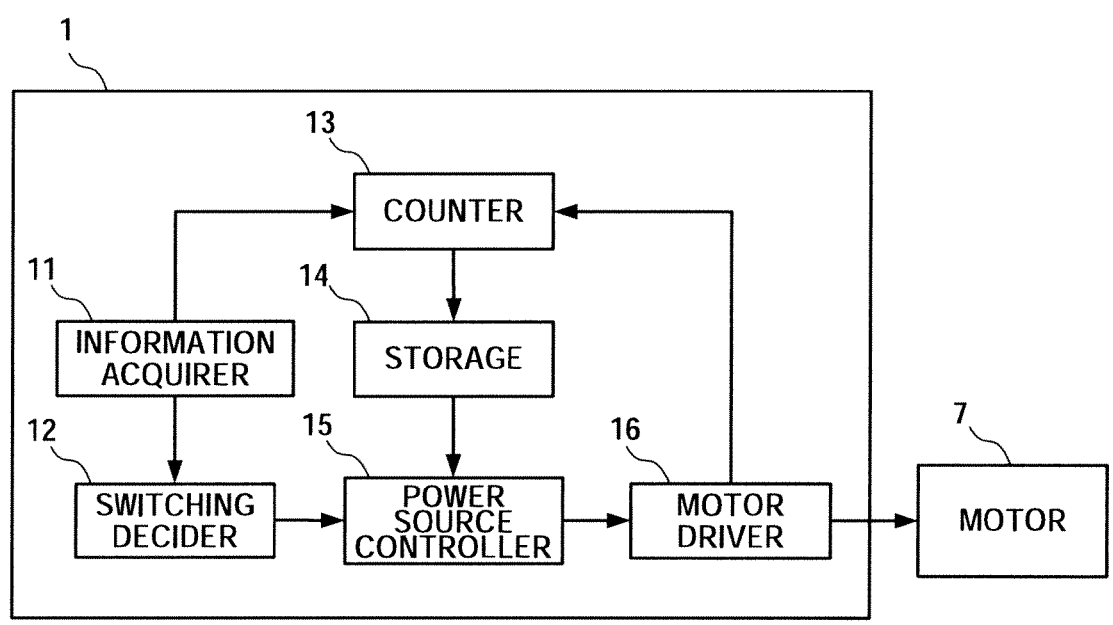
FIG. 5 is a block diagram illustrating a logical configuration example of a seat belt control device according to an embodiment 2.

FIG. 5 is a block diagram illustrating a logical configuration example of a seat belt control device according to an embodiment 2. Similarly to the configuration of the embodiment 1, the information acquirer 11 of the seat belt control device 1 according to the embodiment 2 acquires the external temperature and/or internal temperature of a car C and transmits the external temperature and/or the internal temperature to the counter 13. The configuration of a seat belt control system and the configuration of hardware according to the embodiment 2 are similar to those of the embodiment 1. The external temperature and the internal temperature are measured by a thermometer carried by a vehicle C. The external temperature is a temperature outside a compartment while the internal temperature is a temperature in the compartment. A controller 21 acquires the external temperature and/or internal temperature of the car C through an in-vehicle communication line 10. An ambient temperature around the seat belt device may be regarded as the internal temperature or a dedicated thermometer may be installed in ECU to regard a temperature in ECU as the internal temperature. The temperature in ECU is, for example, an ambient temperature in an ECU case, an ambient temperature in a motor, the measurement temperature of a heat generation site in an ECU component, the measurement temperature of a heat generation site in a motor, or the like.

Based on the external temperature and/or the internal temperature received from the information acquirer 11, the counter 13 sets an initial value $\beta$ of a heat generation counter value stored in a storage 14. At this time, the initial value $\beta$ may be set based on the external temperature, the initial value $\beta$ may be set based on the internal temperature, or the initial value $\beta$ may be set based on the average of the external temperature and the internal temperature. Then, the counter 13 starts an addition and a subtraction from the initial value $\beta$ depending on the operation of a motor driver 16. An addition method and a subtraction method may be similar to those of the embodiment 1 or a temperature-corresponding count table storing an additional value and a subtraction value determined depending on the external temperature and/or the internal temperature may be pre-generated to calculate the heat generation counter value depending on the external temperature and/or the internal temperature with reference to the temperature-corresponding count table. The heat generation counter value is reset once the seat belt control device 1 shifts to a sleep mode whereas the initial value of the heat generation counter value stored in the storage 14 is also set based on the external temperature and/or the internal temperature received from the information acquirer 11 once it shifts to a normal operation mode.

In the embodiment 1, the power source controller 15 acquires the heat generation counter value from the storage 14 when receiving the sleep signal from the switching decider 12 in the normal operation mode and stands by until the heat generation counter value becomes equal to the threshold value $\alpha$ when the heat generation counter value is higher than the threshold value $\alpha$, whereas, in the embodiment 2, $\alpha+\beta$ obtained by adding the threshold value $\alpha$ to the initial value $\beta$ is regarded as a threshold value. Alternatively, a new threshold value $\gamma$ may also be set based on the initial value $\beta$. Also, a threshold value may be updated each time based on the external temperature and/or the internal temperature regularly received from the information acquirer 11.

Figure 6:
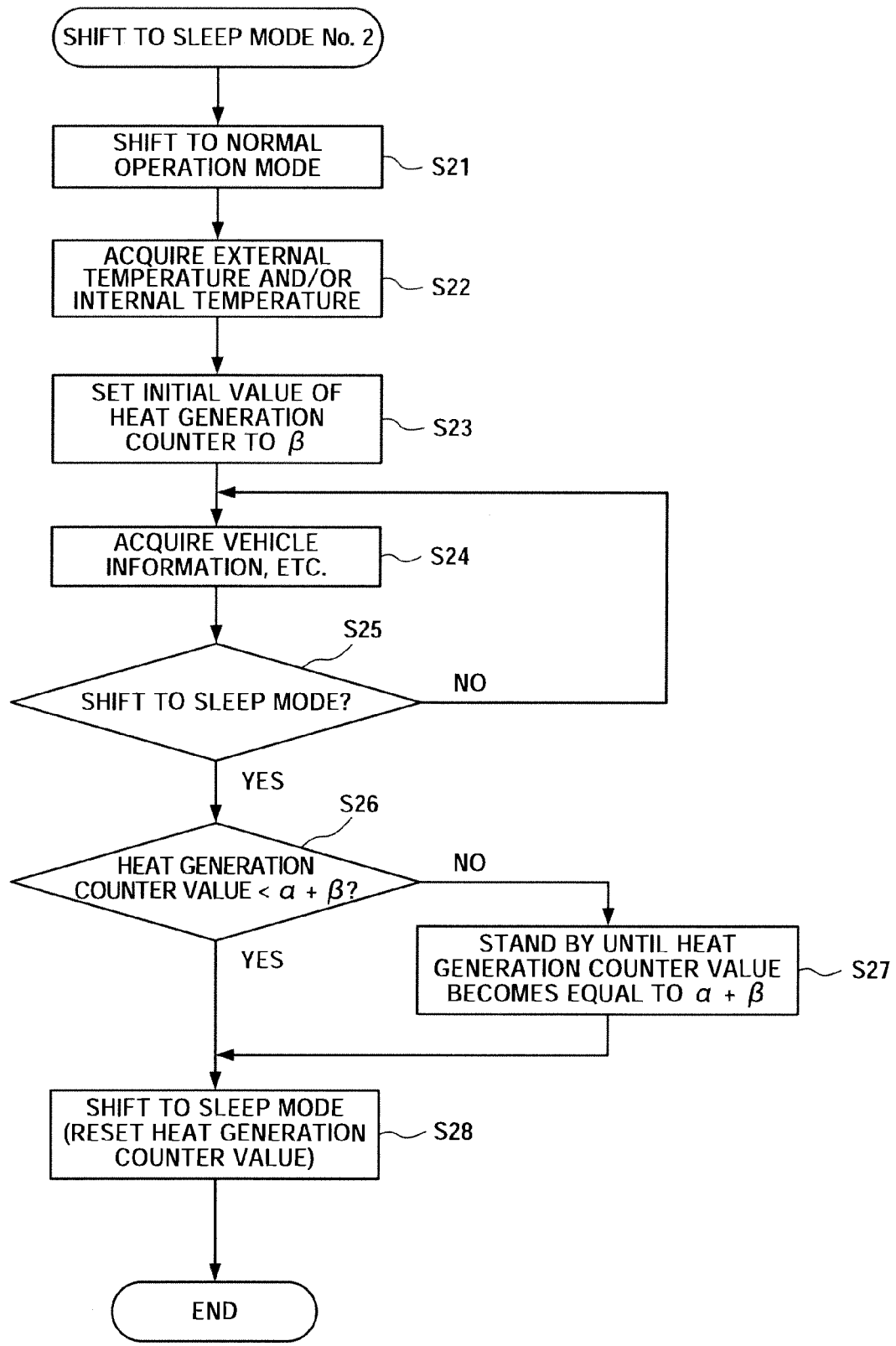
FIG. 6 is a flow chart illustrating an example of the operation of a shift to a sleep mode according to the embodiment 2.

FIG. 6 is a flow chart illustrating an example of the operation of the shift to the sleep mode according to the embodiment 2. Once the seat belt control device 1 shifts from the sleep mode to the normal operation mode (step S21), the information acquirer 11 acquires the external temperature and/or internal temperature of the car C (step S22). Based on the external temperature and/or internal temperature of the car C, the counter 13 sets the initial value of the heat generation counter value to β (step S23). The information acquirer 11 acquires vehicle information, seat belt refractor information and/or the like (step S24). Based on these pieces of information, a switching decider 12 decides whether or not to shift to the sleep mode (step S25). Once the switching decider 12 decides that no shift to the sleep mode is made (step S25; NO), it returns to step S24, stands by for specified time, and then repeats the processes of step S24 and step S25.

Once the switching decider 12 decides that the shift to the sleep mode is made (step S25; YES), the power source controller 15 refers to the heat generation counter value of the storage 14 and decides whether or not the heat generation counter value is lower than the threshold value $\alpha+\beta$ (step S26). The initial value (threshold value) β is set based on the external temperature and/or internal temperature of the car C. That is, the threshold value $\alpha+\beta$ is set to a high value when the external temperature and/or internal temperature of the car C are high and is set to a low value when the external temperature and/or the internal temperature are low. Therefore, when the power source controller 15 decides that the heat generation counter is lower than the threshold value $\alpha+\beta$, it can be decided that the inside of the motor driver 16 (motor drive circuit 25) is not in an overheated state. When the heat generation counter value is lower than the threshold value $\alpha+\beta$ (step S26; YES), the seat belt control device 1 is shifted to the sleep mode (step S28) to end the process. When the heat generation counter value is higher than the threshold value $\alpha+\beta$ (step S26; NO), the power source controller 15 stands by until the counter 13 makes a subtraction from the heat generation counter value to the threshold value $\alpha+\beta$ (step S27) and shifts the seat belt control device 1 to the sleep mode once the heat generation counter value becomes equal to the threshold value $\alpha+\beta$ (step S28) to end the process. Once the seat belt control device 1 shifts to the sleep mode, the heat generation counter value is reset.

According to the seat belt control device 1 of the embodiment 2, the consideration of the external temperature and/or the internal temperature can prevent the temperature of the inside of the motor driver 16 from being increased or decreased by the external temperature and/or the internal temperature and an actual temperature from being higher than the temperature of the drive circuit, predicted by the counter value. In addition, the threshold value during the shift to the sleep mode, which threshold value is more highly accurate, can be set by setting the initial value of the heat generation counter value in consideration of the external temperature and/or the internal temperature.

In addition, the above-described hardware configuration and flow charts are an example and may optionally be changed and modified.

A component which plays a key role for performing the process of the seat belt control device 1 configured by the controller 21, the power supply 22, the source voltage monitor 23, the storage 24, the motor drive circuit 25, the decider 26, and/or the like can be realized using an ordinary computer system without depending on a dedicated system. For example, the seat belt control device 1 which executes the above-described processes by storing a computer program for executing the above-described operation in a computer-readable recording medium (such as a flexible disk, CD-ROM, or DVD-ROM), distributing it, and installing the computer program in a computer may also be configured. In addition, the seat belt control device 1 may also be configured by storing the computer program in a storage device included in a server device on a communication network such as the Internet and download and/or the like of it by an ordinary computer system.

In the case of, e.g., realizing the functions of the seat belt control device 1 by the share of OS (operating system) and an application program or by cooperation between OS and the application program, only the application program component may also be stored in a recording medium or a storage device.

The computer program, piggybacked onto a carrier wave, may also be delivered through a communication network. For example, the above-described computer program may also be posted on a bulletin board (BBS; Bulletin Board System) on the communication network to deliver the above-described computer program through the network. The configuration may also be made to execute the above-described processes by starting this computer program and executing it similarly to another application program under the control of OS.

The descriptions of the embodiments and examples of the present invention as described above are not limited to the present invention. As can be easily understood by a person skilled in the art, the present invention also encompasses various modifications without departing from the description of the claims.

This application is based on Japanese Patent Application No. 2010-48442, filed on Mar. 4, 2010, including its specification, claims, drawings, and abstract. The disclosure of the above-described Japanese Patent Application is incorporated herein by reference in its entirety.

INDUSTRIAL APPLICABILITY

The seat belt control device, the seat belt retractor, the seat belt device, the seat belt control method, and the program according to the present invention are included in a vehicle such as a car and are useful in protection of a passenger.

DESCRIPTION OF REFERENCE NUMERALS

C Car
P Passenger
S Seat
1 Seat belt control device
2 Seat belt
3 Guiding anchor
4 Tang
5 Buckle
6 Seat belt retractor
7 Motor
10 In-vehicle communication line
11 Information acquirer
12 Switching decider
13 Counter
14 Storage
15 Power source controller
16 Motor driver
21 Controller
22 Power supply
23 Source voltage monitor
24 Storage
25 Motor drive circuit
26 Decider
31 Battery
32 Ignition
33 Vehicle information line
34 Seat belt retractor information line
100 Seat belt control system (seat belt device)

The invention claimed is:

1. A seat belt control device which controls a motor which winds up a seat belt, the seat belt control device comprising:
   a storage which stores a heat generation counter value which represents a temperature variation state of at least one of the motor and a motor driver for driving the motor;
   a counter which makes an addition/subtraction of a specified value to/from the heat generation counter value based on operation of the motor driver;
   a decider which decides whether or not to shift from a normal operation mode, in which operating power is supplied to the seat belt control device, to a sleep mode which has a lower power consumption than that of the normal operation mode; and
   a controller which shifts to the sleep mode once the decider decides that a shift to the sleep mode has been made,
   wherein, when the heat generation counter value obtained when the decider decides that the shift to the sleep mode has been made is equal to or greater than a specified threshold value, the controller stands by until the counter makes a subtraction from the heat generation counter value to the threshold value and then shifts to the sleep mode, and
   wherein the heat generation counter value functions as a criterion, which is converted from a measured value obtained by pre-measuring variation in temperature of the motor or the motor driver.

2. The seat belt control device according to claim 1, further comprising an information acquirer which acquires at least one of an external temperature and an internal temperature information of a vehicle including the seat belt control device,
   wherein the counter sets an initial value of the heat generation counter value based on the external temperature or the internal temperature; and
   the controller sets the threshold value based on the initial value of the heat generation counter value.

3. The seat belt control device according to claim 1, wherein the controller sets the threshold value based on a temperature variation state of the at least one of the motor and the motor driver, which is measured to be under a maximum temperature at which the at least one of the motor and the motor driver is drivable.

4. The seat belt control device according to claim 1, wherein when in the sleep mode, electric power is supplied only to the decider.

5. The seat belt control device according to claim 1, wherein when in the sleep mode, electric power is supplied only to the controller.

6. The seat belt control device according to claim 1, wherein the heat generation counter value is calculated based on a drive count table, which associates increasing and decreasing temperatures per unit time with a drive mode of the motor driver.

7. The seat belt control device according to claim 6, wherein the specified value added/subtracted to/from the heat generation value is a constant value.

8. The seat belt control device according to claim 1, wherein the specified value added/subtracted to/from the heat generation value is a constant value.

9. The seat belt control device according to claim 1, wherein the heat generation counter value represents the temperature variation state of a transistor of the motor driver, and wherein the specified value added/subtracted to/from the heat generation value is a constant value.

10. The seat belt control device according to claim 1, wherein a constant value is added to the heat generation counter value whenever the motor driver drives the motor.

11. A seat belt retractor comprising the seat belt control device according to claim 1.

12. A seat belt device comprising:
   a seat belt;
   a guiding anchor which guides the seat belt toward a passenger;
   a tang which is slidably supported by the seat belt;
   a buckle which is fixed in a car and is connected to the tang;
   a seat belt retractor which applies a specified tensile force by winding up the seat belt on a reel;
   a motor which drives the reel; and
   the seat belt control device according to claim 1.

13. A seat belt control method for controlling a motor which winds up a seat belt, wherein the method is carried out by a controller and comprises the following steps:
   a storage step of storing a heat generation counter value which represents a temperature variation state of at least one of the motor and a motor driver for driving the motor;
   a count step of making an addition/subtraction of a specified value to/from the heat generation counter value based on operation of the motor driver;
   a decision step of deciding whether or not to shift the controller from a normal operation mode, in which operating power is supplied to the controller to execute seat belt control, to a sleep mode in which the controller has a lower power consumption than when operating in the normal operation mode; and
   a control step of shifting the controller to the sleep mode when the decision step decides that a shift to the sleep mode has been made,
   wherein, when the heat generation counter value obtained when the decision step decides that the shift to the sleep mode has been made is equal to or greater than a specified threshold value, the control step stands by until the count step makes a subtraction from the heat generation counter value to the threshold value and then the controller shifts to the sleep mode, and wherein the heat generation counter value functions as a criterion, which is converted from a measured value obtained by pre-measuring variation in temperature of the motor or the motor driver.

14. The seat belt control method according to claim 13, further comprising an information acquisition step of acquiring at least one of an external temperature and an internal temperature information of a vehicle,
   wherein an initial value of the heat generation counter value is set based on the external temperature or the internal temperature in the count step; and
   the threshold value is set based on the initial value of the heat generation counter value in the control step.

15. The seat belt control method according to claim 13, wherein, in the control step, the threshold value is set based on a temperature variation state of the at least one of the motor and the motor driver, which is measured to be under a maximum temperature at which the at least one of the motor and the motor driver is drivable.

16. A non-transient computer readable storage medium having instructions stored thereon, which, when executed by one or more data processors, cause the one or more data processors to perform operations comprising:
   a storage step of storing a heat generation counter value which represents a temperature variation state of at least one of a motor, which winds up a seat belt, and a motor driver for driving the motor;

a count step of making an addition/subtraction of a specified value to/from the heat generation counter value based on operation of the motor driver;

a decision step of deciding whether or not to shift from a normal operation mode, in which operating power is supplied to the computer, to a sleep mode which has a lower power consumption than that of the normal operation mode; and a control step of shifting to the sleep mode when the decision step decides that a shift to the sleep mode has been made, wherein, when the heat generation counter value obtained when the decision step decides that the shift to the sleep mode has been made is equal to or greater than a specified threshold value, the control step stands by until the count step makes a subtraction from the heat generation counter value to the threshold value and then shifts to the sleep mode, and wherein the heat generation counter value functions as a criterion, which is converted from a measured value obtained by pre-measuring variation in temperature of the motor or the motor driver.

\* \* \* \* \*